(12) United States Patent
Dotson et al.

(10) Patent No.: US 6,454,076 B1
(45) Date of Patent: Sep. 24, 2002

(54) SCISSORS CHUTE

(75) Inventors: Sean Dotson, Sarasota; Paul Dumas, Bradenton; Joe Kolcun, Tampa, all of FL (US)

(73) Assignee: Gebo Corporation USA, Bradenton, FL (US)

( * ) Notice: Subject to any disclaimer, the term of this patent is extended or adjusted under 35 U.S.C. 154(b) by 35 days.

(21) Appl. No.: 09/755,805

(22) Filed: Jan. 5, 2001

(51) Int. Cl.$^7$ .............................................. B65G 11/00
(52) U.S. Cl. ...................... 193/2 R; 193/2 C; 198/418.6
(58) Field of Search ............................. 193/34, 23, 28, 193/29, 2 C; 198/418.6, 468.8

(56) References Cited

U.S. PATENT DOCUMENTS

| | | | | |
|---|---|---|---|---|
| 3,646,971 A | * | 3/1972 | Godet | 221/65 |
| 3,867,807 A | * | 2/1975 | Doucette | 53/48 |
| 4,228,635 A | * | 10/1980 | Altenpohl et al. | 53/572 |
| 4,293,981 A | * | 10/1981 | Smith | 17/71 |
| 5,119,944 A | * | 6/1992 | Milton | 211/59.2 |
| 5,207,311 A | * | 5/1993 | Terai | 198/419.1 |
| 5,893,447 A | * | 4/1999 | Brintazzoli | 198/465.1 |
| 6,062,426 A | * | 5/2000 | Bartholmey et al. | 222/1 |
| 6,318,956 B1 | * | 11/2001 | Kobacker, II et al. | 414/798.9 |

* cited by examiner

Primary Examiner—Douglas Hess

(57) ABSTRACT

A conveyor system has a housing with a plurality of horizontally extending lower support arms and a plurality of horizontally extending upper support arms spaced above the lower support arms and forming a plurality of guide sets. An upper pair of crossed scissor fingers and a lower pair of crossed scissor fingers are provided. A vertically oriented primary pivot shaft is secured between each upper support arm and its associated lower support arm and through each of the scissor fingers for rotation about a common first axis for each guide set. Four vertically disposed guide plates in each guide set with second pivot shafts are pivotally coupled to an associated end of one upper scissor finger and one lower scissor finger for rotation about second axes. Each guide plate has a radially inwardly oriented extension with a slot and fixed pin extending downwardly from an upper support arm into an associated slot. A driving subassembly includes a common drive bar for concurrently moving the common scissor fingers and guide plates between an inoperative orientation and an operative orientation.

4 Claims, 4 Drawing Sheets

SCISSORS CHUTE

BACKGROUND OF THE INVENTION

1. Field of the Invention

The present invention relates to a scissors chute and more particularly pertains to guiding the downward falling movement of conveyed articles.

2. Description of the Prior Art

The use of conveyors of known designs and configurations is known in the prior art. More specifically, conveyors of known designs and configurations previously devised and utilized for the purpose of conveying articles through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,228,635 to Altenpohl et al. issued Oct. 21, 1980 discloses a Poultry bagging system. U.S. Pat. No. 3,867,807 to Doucette issued Feb. 25, 1975 discloses a carrier applicator machine for bottles. U.S. Pat. No. 4,293,981 to Smith issued Oct. 13, 1981 discloses a crab butchering machine. Lastly, U.S. Pat. No. 5,207,311 to Terai issued May 4, 1993 discloses a method and apparatus for automatically feeding articles in aligned conditions to packing machine.

While these devices fulfill their respective, particular objectives and requirements, the aforementioned patents do not describe a scissors chute that allows guiding the downward falling movement of conveyed articles.

In this respect, the scissors chute according to the present invention substantially departs from the conventional concepts and designs of the prior art, and in doing so provides an apparatus primarily developed for the purpose of guiding the downward falling movement of conveyed articles.

Therefore, it can be appreciated that there exists a continuing need for a new and improved scissors chute which can be used for guiding the downward falling movement of conveyed articles. In this regard, the present invention substantially fulfills this need.

SUMMARY OF THE INVENTION

In view of the foregoing disadvantages inherent in the known types of conveyors of known designs and configurations now present in the prior art, the present invention provides an improved scissors chute. As such, the general purpose of the present invention, which will be described subsequently in greater detail, is to provide a new and improved scissors chute and method which has all the advantages of the prior art and none of the disadvantages.

To attain this, the present invention essentially comprises a scissors chute. First provided as part of the system is a housing. The housing has a plurality of horizontally extending lower support arms and a plurality horizontally extending upper support arms spaced above the lower support arms and forming a plurality of guide sets. The guide sets are laterally spaced from each other for the guiding of the downward falling movement of conveyed articles there between along a vertical path of travel. Next provided are an upper pair of crossed scissor fingers. The upper fingers are located immediately beneath each upper support arm. Also provided are a lower pair of crossed scissor fingers. The lower fingers are located immediately above each lower support arm. Each guide set has a spacer between the upper pair of scissor fingers and the lower pair of scissor fingers.

A vertically oriented primary pivot shaft is next provided. The primary pivot shaft is secured between each upper support arm and its associated lower support arm and through each of the scissor fingers for rotation about a common first axis for each guide set. Four vertically disposed guide plates are provided in each guide set. Of the four guide plates two are interior guide plates and two are exterior guide plates. The guide plates also have second pivot shafts with second pivot axles. The guide plates are pivotally coupled to an associated end of one upper scissor fingers and one lower scissor finger for rotation about second axes. Each guide plate has a radially inwardly oriented extension with a slot and a fixed pin extending downwardly from an upper support arm into an associated slot. In this manner rotational movement of the scissor fingers will cause a concurrent compound rotation of each guide plate about the first axis and also about the second axis. Next provided are a pair of drive links for each guide set. Each drive link has an exterior end pivotally coupled to an adjacent second pivot shaft and an interior end coupled to a common drive pin. Lastly, a driving subassembly is provided. The driving subassembly includes a common drive bar coupled to the drive pins at spaced laterally offset locations. A common linear actuator concurrently moves the common drive bar, drive pins, scissor fingers and guide plates between an inoperative orientation and an operative orientation. In the inoperative orientation for each guide set the interior plates are also in proximity to each other and the exterior plates are in proximity to each other. In the operative orientation for each guide set the interior plates are also widely spaced from each other and the exterior plates are widely spaced from each other. During operation and use the guide plates of adjacent guide sets are widely spaced with respect to each other to create a laterally larger path of travel for receiving articles to be dropped there through when in the inoperative orientation. During operation and use the guide plates of adjacent guide sets are closely spaced with respect to each other to create a laterally smaller path of travel with the guide plates in a generally rectilinear configuration forming a funnel to guide articles being dropped and falling there through when in the operative orientation.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved scissors chute which has all of the advantages of the prior art conveyors of known designs and configurations and none of the disadvantages.

It is another object of the present invention to provide a new and improved scissors chute which may be easily and efficiently manufactured and marketed.

It is further object of the present invention to provide a new and improved scissors chute which is of durable and reliable constructions.

An even further object of the present invention is to provide a new and improved scissors chute which is susceptible of a low cost of manufacture with regard to both materials and labor, and which accordingly is then susceptible of low prices of sale to the consuming public, thereby making such scissors chute economically available to the buying public.

Even still another object of the present invention is to provide a scissors chute for guiding the downward falling movement of conveyed articles.

Lastly, it is an object of the present invention to provide a new and improved conveyor system. First provided is a housing with a plurality of horizontally extending lower support arms and a plurality of horizontally extending upper support arms spaced above the lower support arms and forming a plurality of guide sets. An upper pair of crossed scissor fingers and a lower pair of crossed scissor fingers are provided. A vertically oriented primary pivot shaft is secured between each upper support arm and its associated lower support arm and through each of the scissor fingers for rotation about a common first axis for each guide set. Four vertically disposed guide plates in each guide set with second pivot shafts are pivotally coupled to an associated end of one upper scissor finger and one lower scissor finger for rotation about second axes. Each guide plate has a radially inwardly oriented extension with a slot and fixed pin extending downwardly from an upper support arm into an associated slot. A driving subassembly includes a common drive bar for concurrently moving the common scissor fingers and guide plates between an inoperative orientation and an operative orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
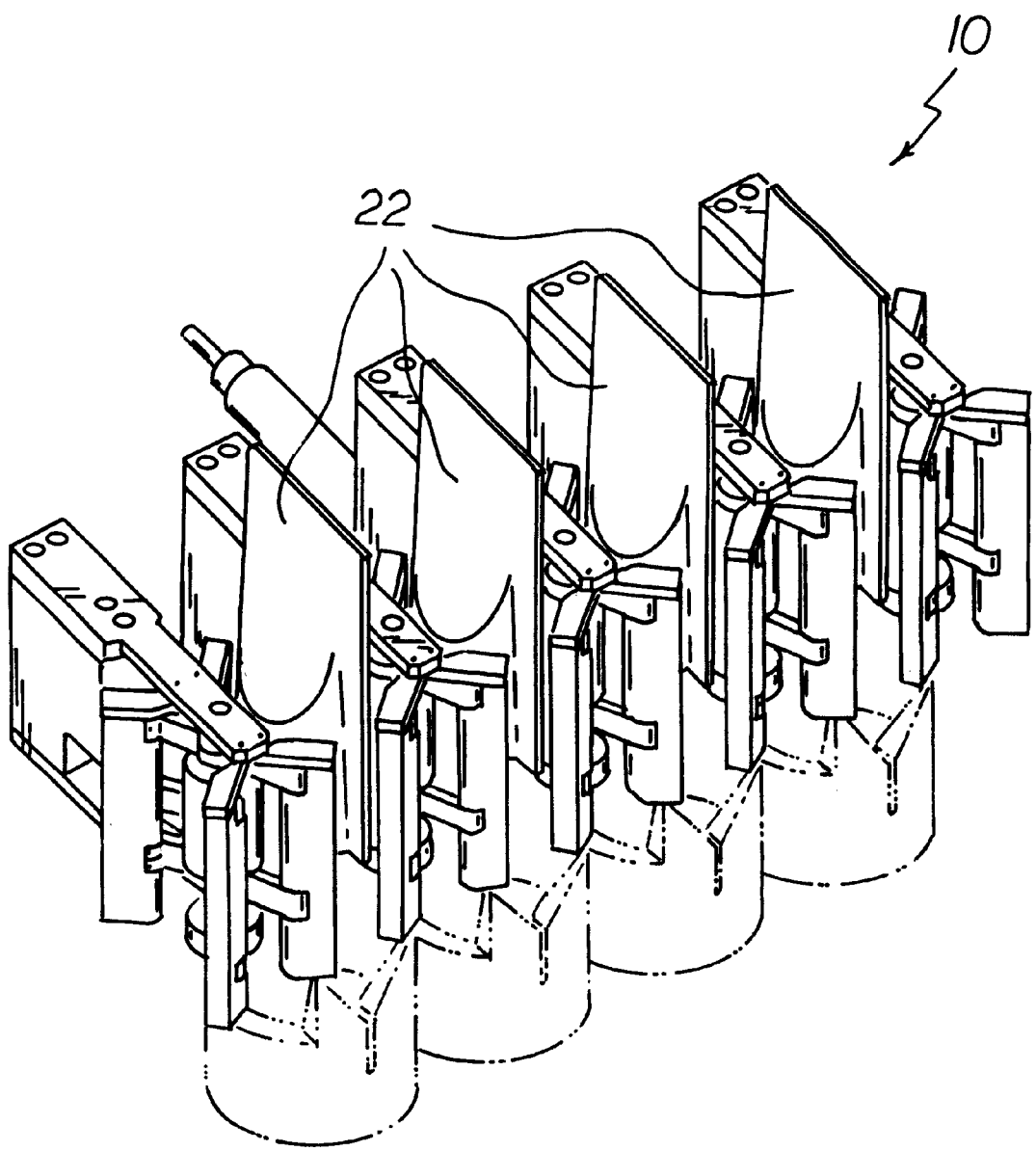
FIG. 1 is a perspective illustration of the scissors chute constructed in accordance with the principles of the present invention.
Figure 2:
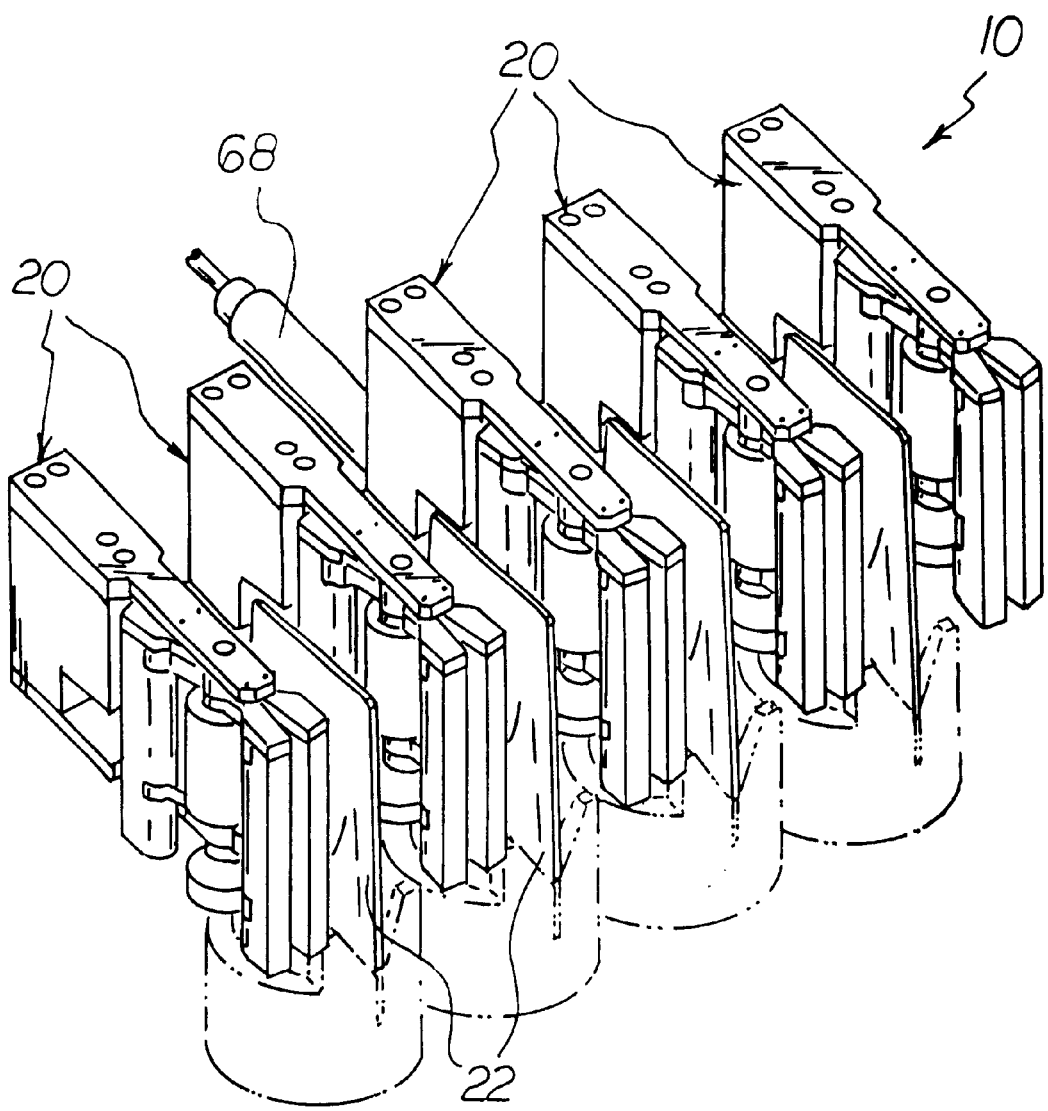
FIG. 2 is a perspective illustration similar to FIG. 1 but showing the guide plates in the inoperative orientation.
Figure 3:
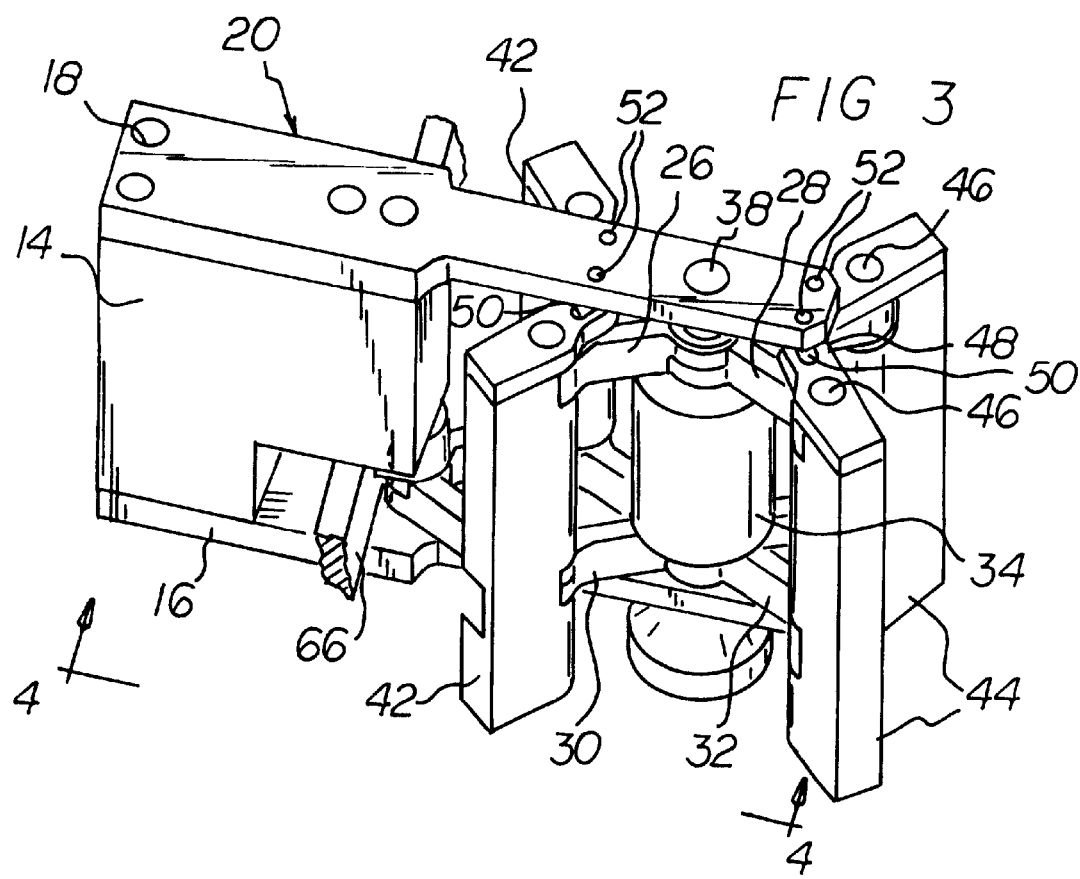
FIG. 3 is an enlarged perspective illustration of one of the guide sets is in the operative orientation.
Figure 4:
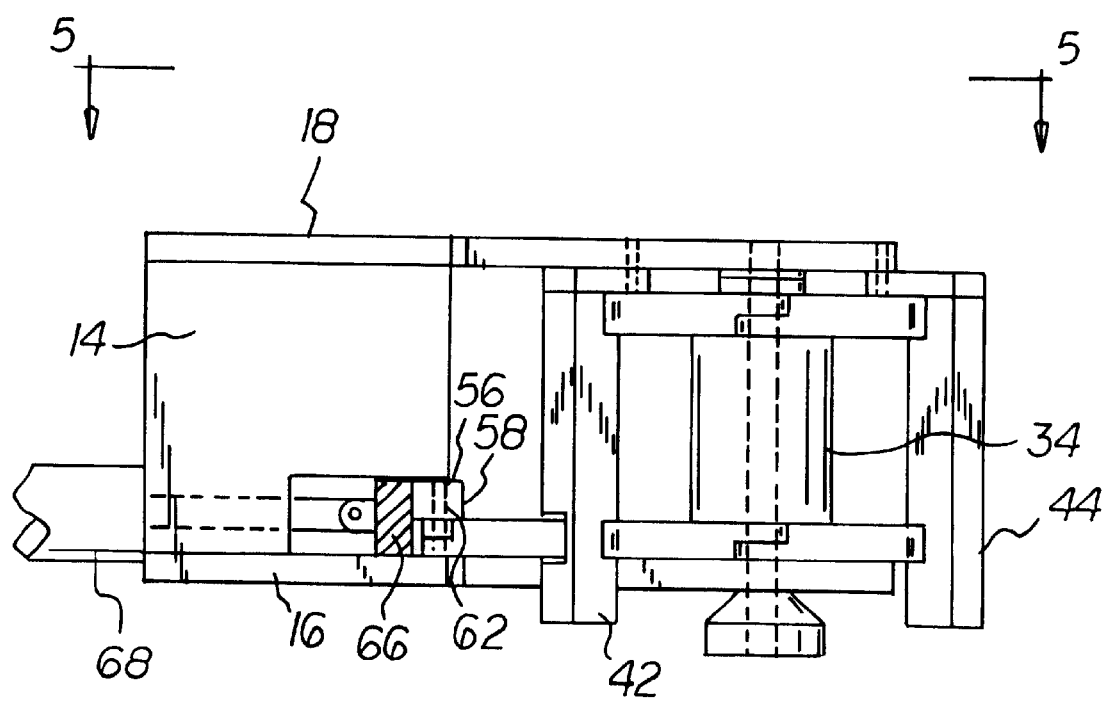
FIG. 4 is side elevational view taken along line 4—4 of FIG. 3.
Figure 5:
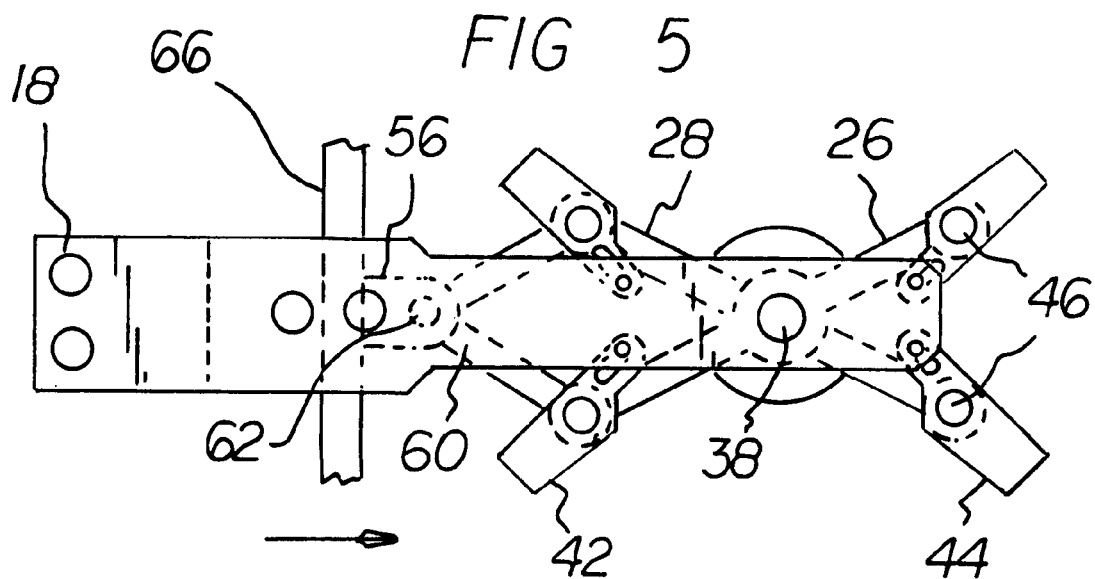
FIG. 5 is a plan view taken along line 5—5 of FIG. 4.
Figure 6:
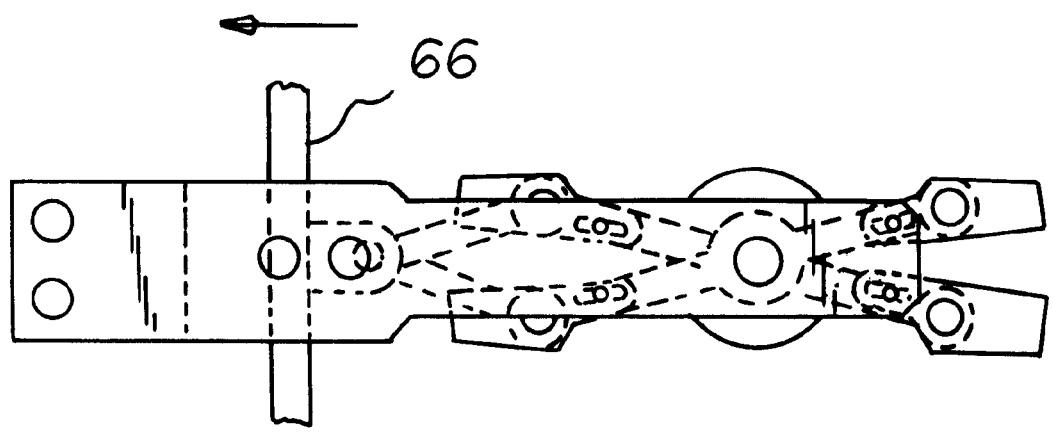
FIG. 6 is a plan view similar to FIG. 5 but showing the guide plates in the inoperative orientation.

With reference now to the drawings, and in particular to FIG. 1 thereof, the preferred embodiment of the new and improved scissors chute embodying the principles and concepts of the present invention and generally designated by the reference numeral 10 will be described.

The present invention, the scissors chute 10 is comprised of a plurality of components. Such components in their broadest context include a housing, an upper pair and a lower pair of crossed scissor fingers, a vertically oriented primary pivot shaft, four vertically disposed guide plates, and a driving subassembly. Such components are individually configured and correlated with respect to each other so as to attain the desired objective.

To attain this, the present invention essentially comprises a scissors chute. First provided as part of the system is a housing 14. The housing has a plurality of horizontally extending lower support arms 16 and a plurality horizontally extending upper support arms 18 spaced above the lower support arms and forming a plurality of guide sets 20. The guide sets are laterally spaced from each other for the guiding of the downward falling movement of conveyed articles 22 there between along a vertical path of travel.

Next provided are an upper pair of crossed scissor fingers 26, 28. The upper fingers are located immediately beneath each upper support arm. Also provided are a lower pair of crossed scissor fingers 30, 32. The lower fingers are located immediately above each lower support arm. Each guide set has a spacer 34 between the upper pair of scissor fingers and the lower pair of scissor fingers.

A vertically oriented primary pivot shaft 38 is next provided. The primary pivot shaft is secured between each upper support arm and its associated lower support arm and through each of the scissor fingers for rotation about a common first axis for each guide set.

Four vertically disposed guide plates are provided in each guide set. Of the four guide plates two are interior guide plates 42 and two are exterior guide plates 44. The guide plates also have second pivot shafts 46 with second pivot axles. The guide plates are pivotally coupled to an associated end of one upper scissor fingers and one lower scissor finger for rotation about second axes. Each guide plate has a radially inwardly oriented extension 48 with a slot 50 and a fixed pin 52 extending downwardly from an upper support arm into an associated slot. In this manner rotational movement of the scissor fingers will cause a concurrent compound rotation of each guide plate about the first axis and also about the second axis.

Next provided are a pair of drive links 56 for each guide set. Each drive link has an exterior end 58 pivotally coupled to an adjacent second pivot shaft and an interior end 60 coupled to a common drive pin 62.

Lastly, a driving subassembly is provided. The driving subassembly includes a common drive bar 66 coupled to the drive pins at spaced laterally offset locations. A common air cylinder 68 concurrently moves the common drive bar, drive pins, scissor fingers and guide plates between an inoperative orientation and an operative orientation. In the inoperative orientation for each guide set the interior plates are also in proximity to each other and the exterior plates are in proximity to each other. In the operative orientation for each guide set the interior plates are also widely spaced from each other and the exterior plates are widely spaced from each other. During operation and use the guide plates of adjacent guide sets are widely spaced with respect to each other to create a laterally larger path of travel for receiving articles to be dropped there through when in the inoperative orientation. During operation and use the guide plates of adjacent guide sets are closely spaced with respect to each other to create a laterally smaller path of travel with the guide plates in a generally rectilinear configuration forming a funnel to guide articles being dropped and falling there through when in the operative orientation.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by letters patent of the united states is as follows:

1. A scissors chute for guiding the downward falling movement of conveyed articles, comprising, in combination;

a housing having a plurality of horizontally extending lower support arms and a plurality horizontally extending upper support arms spaced above the lower support arms and forming a plurality of guide sets, the guide sets being laterally spaced from each other for the guiding of the downward falling movement of conveyed articles there between along a vertical path of travel;

an upper pair of crossed scissor fingers located immediately beneath each upper support arm and a lower pair of crossed scissor fingers located immediately above each lower support arm, each guide set having a spacer between the upper pair of scissor fingers and the lower pair of scissor fingers, a vertically oriented primary pivot shaft secured between each upper support arm and its associated lower support arm and through each of the scissor fingers for rotation about a common first axis for each guide set;

four vertically disposed guide plates, two interior guide plates and two exterior guide plates, in each guide set with second pivot shafts with second pivot axles and pivotally coupled to an associated end of one upper scissor fingers and one lower scissor finger for rotation about second axes, each guide plate having a radially inwardly oriented extension with a slot and a fixed pin extending downwardly from an upper support arm into an associated slot whereby rotational movement of the scissor fingers will cause a concurrent compound rotation of each guide plate about the first axis and also about the second axis;

a pair of drive links for each guide set with each drive link having an exterior end pivotally coupled to an adjacent second pivot shaft and an interior end coupled to a common drive pin; and a driving subassembly including a common drive bar coupled to the drive pins at spaced laterally offset locations and with a common air cylinder for concurrently moving the common drive bar, drive pins, scissor fingers and guide plates between an inoperative orientation wherein for each guide set the interior plates are also in proximity to each other and the exterior plates are in proximity to each other and an operative orientation wherein for each guide set the interior plates are widely spaced from each other and the exterior plates are widely spaced from each other so that during operation and use the guide plates of adjacent guide sets are widely spaced with respect to each other to create a laterally larger path of travel for receiving articles to be dropped there through when in the inoperative orientation and so that during operation and use the guide plates of adjacent guide sets are closely spaced with respect to each other to create a laterally smaller path of travel with the guide plates in a generally rectilinear configuration forming a funnel to guide articles being dropped and falling there through when in the operative orientation.

2. The system as set forth in claim 1 wherein in an inoperative orientation for each guide set the interior plates are in proximity to each other and the exterior plates are also in proximity to each other and an operative orientation wherein for each guide set the interior plates are widely spaced from each other and the exterior plates are also widely spaced from each other.

3. A conveyor system comprising:

a housing having a plurality of horizontally extending lower support arms and a plurality of horizontally extending upper support arms spaced above the lower support arms and forming a plurality of guide sets;

an upper pair of crossed scissor fingers and a lower pair of crossed scissor fingers associated with each guide set;

a vertically oriented primary pivot shaft secured between each upper support arm and its associated lower support arm and through each of the scissor fingers for rotation about a common first axis for each guide set;

four vertically disposed guide plates in each guide set with second pivot shafts pivotally coupled to an associated end of one upper scissor finger and one lower scissor finger for rotation about second axes, each guide plate having a radially inwardly oriented extension with a slot and fixed pin extending downwardly from an upper support arm into an associated slot; and a driving subassembly including a common drive bar for concurrently moving the common scissor fingers and guide plates between an inoperative orientation and an operative orientation.

4. The system as set forth in claim 3 wherein the drive assembly includes a pair of drive links for each guide set with each drive link having an exterior end pivotally coupled to an adjacent second pivot shaft and an interior end coupled to a common drive pin.

* * * * *